United States Patent
Lin

(10) Patent No.: US 6,737,393 B2
(45) Date of Patent: May 18, 2004

(54) LIQUID BUBBLE SOLUTION FOR PRODUCING LUMINOUS BUBBLES

(76) Inventor: Mon-Sheng Lin, 5th Floor, No. 4, Lane 7, Pao Kao Road, Hsintien, Taipei Hsien (TW)

(*) Notice: Subject to any disclaimer, the term of this patent is extended or adjusted under 35 U.S.C. 154(b) by 0 days.

(21) Appl. No.: 10/635,498

(22) Filed: Aug. 7, 2003

(65) Prior Publication Data

US 2004/0026664 A1 Feb. 12, 2004

Related U.S. Application Data

(63) Continuation-in-part of application No. 09/836,193, filed on Apr. 18, 2001, now abandoned.

(51) Int. Cl.$^7$ .............................. C11D 3/42; C09K 11/06
(52) U.S. Cl. ................... 510/394; 510/419; 510/325; 510/495; 516/77; 252/301.21; 252/301.22; 252/1; 252/700
(58) Field of Search ................. 510/325, 394, 510/419, 495, 516; 516/77; 252/1, 700, 301.21, 301.22

(56) References Cited

U.S. PATENT DOCUMENTS

| | | | | |
|---|---|---|---|---|
| 3,953,380 A | * | 4/1976 | Sundby | |
| 4,249,412 A | * | 2/1981 | Townsend, III | 73/40.7 |
| 4,388,079 A | * | 6/1983 | Suzuki et al. | 8/648 |
| 4,764,302 A | * | 8/1988 | Baker et al. | 252/301.23 |
| 4,970,029 A | * | 11/1990 | Halas | 252/301.29 |
| 5,174,927 A | * | 12/1992 | Honsa | |
| 5,246,631 A | * | 9/1993 | Halbritter | 252/700 |
| 5,876,995 A | * | 3/1999 | Bryan | 435/189 |
| 5,961,894 A | * | 10/1999 | Swetland, Jr. et al. | 252/700 |
| 6,303,164 B2 | * | 10/2001 | Cottone et al. | 426/104 |

FOREIGN PATENT DOCUMENTS

| JP | 7-167541 | * | 7/1995 |
|---|---|---|---|
| JP | 10-26572 | * | 1/1998 |

OTHER PUBLICATIONS

JP English Language Abstract Pub–No. JP 410026572A, Jan. 27, 1998.*
JP English Language Abstract Pub–No. JP 407167541, Jul. 4, 1995.*

* cited by examiner

*Primary Examiner*—Joseph D. Anthony
(74) *Attorney, Agent, or Firm*—Troxell Law Office PLLC

(57) ABSTRACT

A liquid bubble solution comprising by volume: 45%~70% water, 8%~25% surface active agent, 2% glycerin, 1%~2% fluorescent brightening agent, 4%~6% luminous powder and 15%~20% polyvinyl alcohol, and adapted to produce bubbles that provide illumination when viewed in the dark and under an external source of invisible ultraviolet or infrared radiation; the adoption of the luminous powder provides the function of illuminating in the dark while the polyvinyl alcohol forms a polyvinyl alcohol film on the surface of the bubble, making the bubble touchable and unbreakable.

5 Claims, No Drawings

LIQUID BUBBLE SOLUTION FOR PRODUCING LUMINOUS BUBBLES

RELATED APPLICATION

This patent application is a continuation-in-part of U.S. patent application Ser. No. 09/836,193 filed Apr. 18, 2001 now abandoned.

BACKGROUND OF THE INVENTION

The present invention relates to a liquid bubble solution for producing light bubbles and, more particularly, to such a liquid bubble solution adapted to produce bubbles that provide illumination when viewed in the dark and under an external source of invisible ultraviolet or infrared radiation; also, the adoption of the luminous powder to absorb light provides the function of illuminating in the dark while the polyvinyl alcohol forms a polyvinyl alcohol film on the surface of the bubble, making the bubble touchable and unbreakable.

A known liquid bubble solution for producing black light bubbles comprising by volume: 75%~90% surface active agent and 10%~25% fluorescent agent, and adapted to provide illumination of the bubbles when viewed in the dark and under an external source of invisible ultraviolet or infrared radiation. This composition of liquid bubble solution has numerous drawbacks as outlined hereinafter:

1. High manufacturing cost because of high concentration of fluorescence agent.
2. Low bubble producing rate because of low surface tension due to high concentration of fluorescence agent.
3. Low luminous effect. Because of low surface tension, fluorescent light is evenly distributed in the bubbles, and the periphery of each bubble is less bright.
4. High contamination risk. Because a particular pigment dispersion is added to the latex-like liquid bubble solution for producing a particular color of bubble, a color stain is left on the clothes, floor, or any object touching the liquid bubble solution.

SUMMARY OF THE INVENTION

The present invention aims to provide a liquid bubble solution, which eliminates the aforesaid drawbacks.

According to the invention, there is provided a liquid bubble solution for producing bubbles that provide illumination when viewed in the dark and under an external source of invisible ultraviolet or infrared radiation; the adoption of the luminous powder provides the function of illuminating in the dark while the polyvinyl alcohol forms a polyvinyl alcohol film on the surface of the bubble, making the bubble touchable and unbreakable; the liquid bubble solution comprising by volume: 45%~70% water, 8%~25% surface active agent, 2% glycerin, 1%~2% fluorescent brightening agent, 4%~6% luminous powder and 15%~20% polyvinyl alcohol, wherein said fluorescent brightening agent is a liquid of light brown color obtained from Diamino-Stilbene Disulphonic Acid Derivatives, the liquid bubble solution having a transparent to semitransparent color.

The liquid bubble solution according to the present invention achieves the following advantages:

1. Low manufacturing cost because of low concentration (1%~6%) of fluorescent brightening agent.
2. High bubble producing rate because low concentration of fluorescent brightening agent produces less effect to surface tension of bubbles.
3. High luminous effect. Because of high surface tension, fluorescent light is concentrated on the periphery of each produced bubble.
4. Low contamination risk. Because the liquid bubble solution is maintained transparent or semitransparent when added with a particular dye, contamination on the clothes, floor, or any object touching the bubbles is insignificant.
5. Wide range of working temperature. The liquid bubble solution contains 2% glycerin, which produces a wetting effect to help dispersion of surface active agent and dye
6. Illuminating in the dark through the adoption of the luminous powder to absorb light. Even contained in a transparent container, the bubble liquid can still be seen, and bubbles produced from the bubble liquid can also be viewed in the dark.
7. Protecting the bubbles from bursting by forming a polyvinyl alcohol film on the surface.

DETAILED DESCRIPTION OF THE PREFERRED EMBODIMENT

A liquid bubble solution in accordance with the present invention comprising by volume: 45%~70% water, 8%~25% surface active agent, 2% glycerin, 1%~2% fluorescent brightening agent, 4%~6% luminous powder and 15%~20% polyvinyl alcohol. The water used is well sterilized. The surface active agent used is same as that used in regular liquid bubble solutions, and is mainly comprised of liquid soap. Glycerin produces wetting effect to help dispersion of surface active agent, and to prevent surface active agent from forming a gel, so as to widen the range of working temperature.

The aforesaid fluorescent brightening agent is a liquid of light brown color obtained from Diamino-Stilbene Disulphonic Acid Derivatives. The ions of the fluorescent brightening agent are anions. The fluorescent brightening agent has the following properties:

| | |
|---|---|
| Specific gravity: | 1.1~1.25 under 20° C. |
| PH value: | 7~9 under 20° C. |
| Freezing point: | 4° C. approximately |
| Boiling point | 103° C. approximately |

Further, the fluorescent brightening agent is highly stable and not reactive, neither inflammable nor explosive. When diluted with water, the fluorescent brightening agent is non-toxic, and not irritating to skin.

The above luminous powder is obtained from flement green SPS, whose light-absorption feature allows bubble liquid to be seen when contained in a transparent container while produces visible bubbles in the dark.

The above polyvinyl alcohol forms a film on the surface of the bubble, making the bubble touchable and unbreakable.

A liquid bubble solution made subject to the aforesaid composition has a transparent to semitransparent color that produces fluorescence light of blue to purple color when viewed in the dark and under an external source of invisible ultraviolet or infrared radiation. Because the bubbles have high surface tension, produced fluorescent light is concentrated on the periphery of the bubbles. Further, 0.2%~0.8% volume viscosity index improver may be added to the solution to increase its viscosity, so as to improve bubble formation rate.

In order to produce a particular color, a particular color dye may be added to the liquid bubble solution at the ratio of 5%~20% volume dye with 80%~95% volume liquid bubble solution. The dye used is a liquid pigment. The use of glycerin helps dispersion of particles of the dye in the liquid bubble solution. When mixed with the dye, the liquid bubble solution has the form of a transparent to semitransparent liquid that produces a particular color of fluorescent light when viewed in the dark and under an external source of invisible ultraviolet or infrared radiation. Further, because the liquid bubble solution is a transparent to semitransparent liquid, it leaves insignificant stain on the object, which touches the liquid bubble solution.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A liquid bubble solution for producing bubbles that provide illumination when viewed in the dark and under an external source of invisible ultraviolet or infrared radiation, the liquid bubble solution comprising by volume: 45%~70% water, 8%~25% surface active agent, 2% glycerin, 1%~2% fluorescent brightening agent, 4%~6% luminous powder and 15%~20% polyvinyl alcohol, wherein said fluorescent brightening agent is a liquid of light brown color obtained from Diamino-Stilbene Disulphonic Acid Derivatives, the liquid bubble solution having a transparent to semitransparent color.

2. The liquid bubble solution of claim 1 further comprising 0.2%~0.8% volume viscosity index improver.

3. The liquid bubble solution of claim 1 further comprising a color dye.

4. The liquid bubble solution of claim 3, wherein said color dye is a liquid dye.

5. The liquid bubble solution of claim 3, wherein said color dye is added to said liquid bubble solution at the ratio of 5%~20% volume dye with 80%~95% volume liquid bubble solution.

* * * * *